(12) United States Patent
Russalian (10) Patent No.: US 12,215,693 B2
(45) Date of Patent: Feb. 4, 2025

(54) PERMANENT MAGNET ROTOR FOR AN AXIAL FLUX MOTOR

(71) Applicant: GATES CORPORATION, Denver, CO (US)

(72) Inventor: Vigel Russalian, Macomb, MI (US)

(73) Assignee: Gates Corporation, Denver, CO (US)

( * ) Notice: Subject to any disclaimer, the term of this patent is extended or adjusted under 35 U.S.C. 154(b) by 0 days.

(21) Appl. No.: 17/789,769

(22) PCT Filed: Jan. 8, 2021

(86) PCT No.: PCT/US2021/012567
§ 371 (c)(1),
(2) Date: Jun. 28, 2022

(87) PCT Pub. No.: WO2021/142177
PCT Pub. Date: Jul. 15, 2021

(65) Prior Publication Data
US 2023/0044524 A1    Feb. 9, 2023

Related U.S. Application Data

(60) Provisional application No. 62/959,010, filed on Jan. 9, 2020.

(51) Int. Cl.
*F04D 1/00*    (2006.01)
*F01P 5/12*    (2006.01)
(Continued)

(52) U.S. Cl.
CPC .............. *F04D 13/064* (2013.01); *F01P 5/12* (2013.01); *F04D 1/00* (2013.01); *F04D 13/026* (2013.01);
(Continued)

(58) Field of Classification Search
CPC ........ F04D 1/00; F04D 13/026; F04D 13/064; F04D 13/0646; F04D 29/22;
(Continued)

(56) References Cited

U.S. PATENT DOCUMENTS 5,655,485 A * 8/1997 Kusase .................... H02K 7/14
123/41.31
6,034,465 A * 3/2000 McKee ............... F04D 13/0666
417/406
(Continued)

OTHER PUBLICATIONS

United States Patent and Trademark Office, International Search Report, International application No. PCT/US2021/012567, mailing date: Apr. 1, 2021.

*Primary Examiner* — Dominick L Plakkoottam
(74) *Attorney, Agent, or Firm* — Kevin J. Aiken, Esq.

(57) ABSTRACT

An axial flux motor water pump comprising a housing, a cover attached to the housing, a stator mounted within the housing, the stator comprising a plurality of stator poles mounted in a ring, each stator pole comprising an electric wire winding, a rotor journaled to the housing in cooperating relation to the stator on a single bearing, an impeller fixed to an end of the rotor, a plurality of magnets mounted to an end of the rotor in cooperative relation to the stator poles, a seal between the rotor and housing whereby the stator and magnets are in a dry zone, the stator enrobed in thermal
(Continued)

potting within the housing; and power electronics contained in the cover. The rotor portion of the rotor may be manufactured in a sintering process.

6 Claims, 9 Drawing Sheets (51) Int. Cl.
 *F04D 13/02* (2006.01)
 *F04D 13/06* (2006.01)
 *F04D 29/22* (2006.01)
(52) U.S. Cl.
 CPC ..... *F04D 13/0646* (2013.01); *F04D 13/0666* (2013.01); *F04D 29/22* (2013.01); *F05D 2230/22* (2013.01)
(58) Field of Classification Search
 CPC .. F04D 29/049; F04D 13/0666; F04D 29/026; F04D 13/0693; F04D 15/0066; F04D 29/4293; F04D 29/106; F04D 29/406; F04D 29/5866; F04D 29/5806; F04D 13/08; F04D 29/056; F04D 29/426; F01P 5/12; F01P 2005/125; F01P 5/10; C22C 2202/02; B22F 5/10; F05D 2230/22; F05D 2210/11; H02K 1/2795; H02K 15/03; H02K 1/14; H02K 21/24; H02K 1/146; H02K 3/325; H02K 7/14; H02K 1/2793; F05B 2240/57
 See application file for complete search history.

(56) References Cited

U.S. PATENT DOCUMENTS

| | | | |
|---|---|---|---|
| 8,035,273 B2* | 10/2011 | Ionel | H02K 1/30 |
| | | | 310/216.123 |
| 2004/0103521 A1* | 6/2004 | Reiter, Jr. | H02K 1/02 |
| | | | 419/36 |
| 2006/0013684 A9 | 1/2006 | Tamagawa et al. | |
| 2008/0284268 A1 | 11/2008 | Yuratich et al. | |
| 2009/0200890 A1* | 8/2009 | Halstead | H02K 15/0464 |
| | | | 29/596 |
| 2012/0126637 A1 | 5/2012 | Ankeney et al. | |
| 2012/0134789 A1* | 5/2012 | Murakami | F04D 13/02 |
| | | | 415/182.1 |
| 2013/0058812 A1* | 3/2013 | Kim | F04D 13/027 |
| | | | 417/420 |
| 2013/0136628 A1* | 5/2013 | Lee | F04D 13/064 |
| | | | 417/357 |
| 2013/0195696 A1* | 8/2013 | Sugimura | H02K 11/33 |
| | | | 417/410.1 |
| 2013/0270945 A1* | 10/2013 | Ziegler | H02K 5/16 |
| | | | 310/90 |
| 2014/0103771 A1 | 4/2014 | Figgins et al. | |
| 2015/0030479 A1 | 1/2015 | Muller | |
| 2015/0034294 A1 | 2/2015 | Miles et al. | |
| 2015/0155801 A1 | 6/2015 | Ross | |
| 2016/0061201 A1* | 3/2016 | Frank | B22F 3/164 |
| | | | 29/598 |
| 2016/0069352 A1* | 3/2016 | Kreidler | F04D 29/263 |
| | | | 29/598 |
| 2016/0148735 A1* | 5/2016 | Delette | H01F 1/086 |
| | | | 419/38 |
| 2016/0248292 A1* | 8/2016 | Takarai | H05K 5/061 |
| 2017/0256999 A1* | 9/2017 | Turner | H02K 21/24 |
| 2018/0133857 A1 | 5/2018 | Keibach | |

* cited by examiner

PERMANENT MAGNET ROTOR FOR AN AXIAL FLUX MOTOR

FIELD OF THE INVENTION

Embodiments of the present invention generally relate to an axial flux motor water pump, and more particularly, to an axial flux motor water pump comprising a mechanical seal. In addition, some embodiments of the present invention employ a permanent magnet rotor manufactured in a sintering process.

BACKGROUND OF THE INVENTION

Some embodiments of the present invention relate to a water pump for pumping a fluid, in particular, a cooling liquid in an internal combustion engine or other application requiring a cooling fluid circulating pump. Axial flux motors used with water pumps are known from the related art. In an axial flux motor, the magnetic flux lines extend in the air gap of the motor in an axial direction. The stators typically comprise round wire windings.

Representative of the art is US patent application 2015/0030479 which discloses a wet rotor pump with an axial flux motor that includes a stator and a rotor. The stator is arranged in a dry zone while the rotor on an impeller is arranged in a wet zone. The rotor is formed by one or more samarium cobalt (SmCo) permanent magnets.

Representative art further includes US patent application 2017/0016449 which discloses a pump comprising a housing partially defining a cavity, an impeller arranged in cavity, the impeller including a first disk, and a vane arranged on the first disk, the impeller operative to rotate about a rotational axis, a first stator core arranged on the housing, windings arranged on the first stator core, and a first inlet defined by the housing, wherein the first inlet, the impeller, and the housing partially define a fluid flow path.

One drawback of axial flux motors of the prior art and other electromechanical motors is that the rotor is comprised of a permanent magnet or magnets interconnected to a frame by way of glue, for example. That is, rotors found in electric motors generally consist of a permanent magnet, or plurality thereof, affixed to a steel laminate core (in some instances, a soft metallic core). These components are made separately and joined by attaching the single magnet or plurality of magnets to the core by press-fitting, gluing, or other joining methods. The prior art method is inefficient, creates large variations between rotor assemblies, requires costly testing procedures, and results in rotors with decreased reliability and increase instances of weight imbalance. As one of ordinary skill in the art will appreciate, the required joining process also increases production cost.

Thus, it is the long-felt need to provide an axial flux motor water pump comprising a mechanical seal and thermal potting about the stator. It is also a need to provide a permanent magnet rotor that is precisely balanced, less costly to manufacture, etc. Embodiments of the present invention meet these needs.

SUMMARY OF THE INVENTION

It is one aspect of some embodiments of the invention to provide an axial flux motor water pump comprising a mechanical seal and thermal potting about the stator.

It is another aspect of some embodiments of the present invention to provide a permanent magnet rotor made of an efficient production process. Accordingly, one embodiment of the contemplated rotor is manufactured by a sintering process. The sintering manufacturing process can be performed in a single step or in two steps. The one-step process employs a ram that compresses materials associated with the rotor's frame and magnet in a die. The two-step process first forms a frame in the die, wherein ferromagnetic material then is placed on the pre-formed frame. Compression of the ferromagnetic material onto the pre-formed frame creates the final rotor assembly. Those of ordinary skill in the art will appreciate that the two-step compaction process may be modified to a three-step process if interface materials are required between the frame and the ferromagnetic material. Regardless of the process by which the rotor is manufactured, a heating step may be required to fuse the constituent parts. The processes described herein contemplate manufacturing a rotor having a plurality of magnetized areas or a magnetized annulus that covers the entirety of the frame, which is may also be referred to as the "core" herein.

One embodiment of the present invention comprises an axial flux motor water pump comprising a housing, a cover attached to the housing, a stator mounted within the housing, the stator comprising a plurality of stator poles mounted in a ring, each stator pole comprising an electric wire winding, a rotor journaled to the housing in cooperating relation to the stator on a single bearing, an impeller fixed to an end of the rotor, a plurality of magnets mounted to an end of the rotor in cooperative relation to the stator poles, a seal between the rotor and housing whereby the stator and magnets are in a dry zone, the stator enrobed in thermal potting within the housing; and power electronics contained in the cover. In some variations of this embodiment, the rotor is manufactured using sintering techniques.

The term "a" or "an" entity, as used herein, refers to one or more of that entity. As such, the terms "a" (or "an"), "one or more" and "at least one" can be used interchangeably herein. Further, the phrases "at least one," "one or more," and "and/or," as used herein, are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

Unless otherwise indicated, all numbers expressing quantities, dimensions, conditions, and so forth used in the specification and drawing figures are to be understood as being approximations that may be modified in all instances as required for a particular application of the novel assembly and method described herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials, or acts and the equivalents thereof shall include all those described in the Summary, Brief Description of the Drawings, Detailed Description and in the appended drawing figures.

The Summary of the Invention is neither intended nor should it be construed as being representative of the full extent and scope of the present invention. That is, these and other aspects and advantages will be apparent from the disclosure of the invention(s) described herein. Further, the above-described embodiments, aspects, objectives, and configurations are neither complete nor exhaustive. As will be appreciated, other embodiments of the invention are possible using, alone or in combination, one or more of the features set forth above or described below. Moreover, references made herein to "the present invention" or aspects thereof should be understood to mean certain embodiments of the present invention and should not necessarily be construed as limiting all embodiments to a particular description. The present invention is set forth in various levels of detail in the Summary of the Invention as well as in the attached drawings and the Detailed Description and no limitation as to the scope of the present invention is intended by either the inclusion or non-inclusion of elements, components, etc. in this Summary of the Invention. Additional aspects of the present invention will become more readily apparent from the Detailed Description, particularly when taken together with the drawings.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of these inventions.

It should be understood that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

Figure 1:
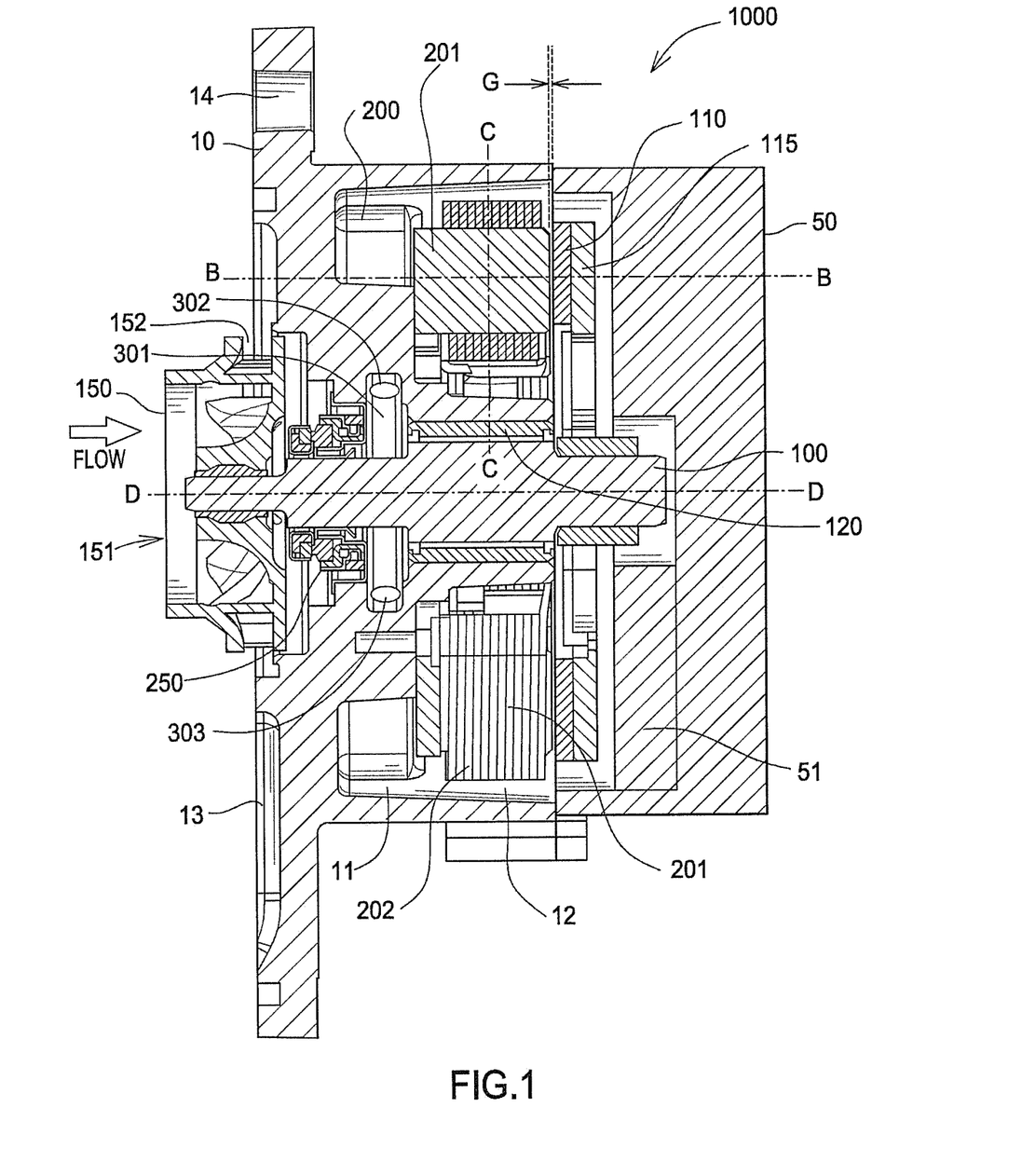
FIG. 1 is a cross-section A-A of the pump from FIG. 2.
Figure 2:
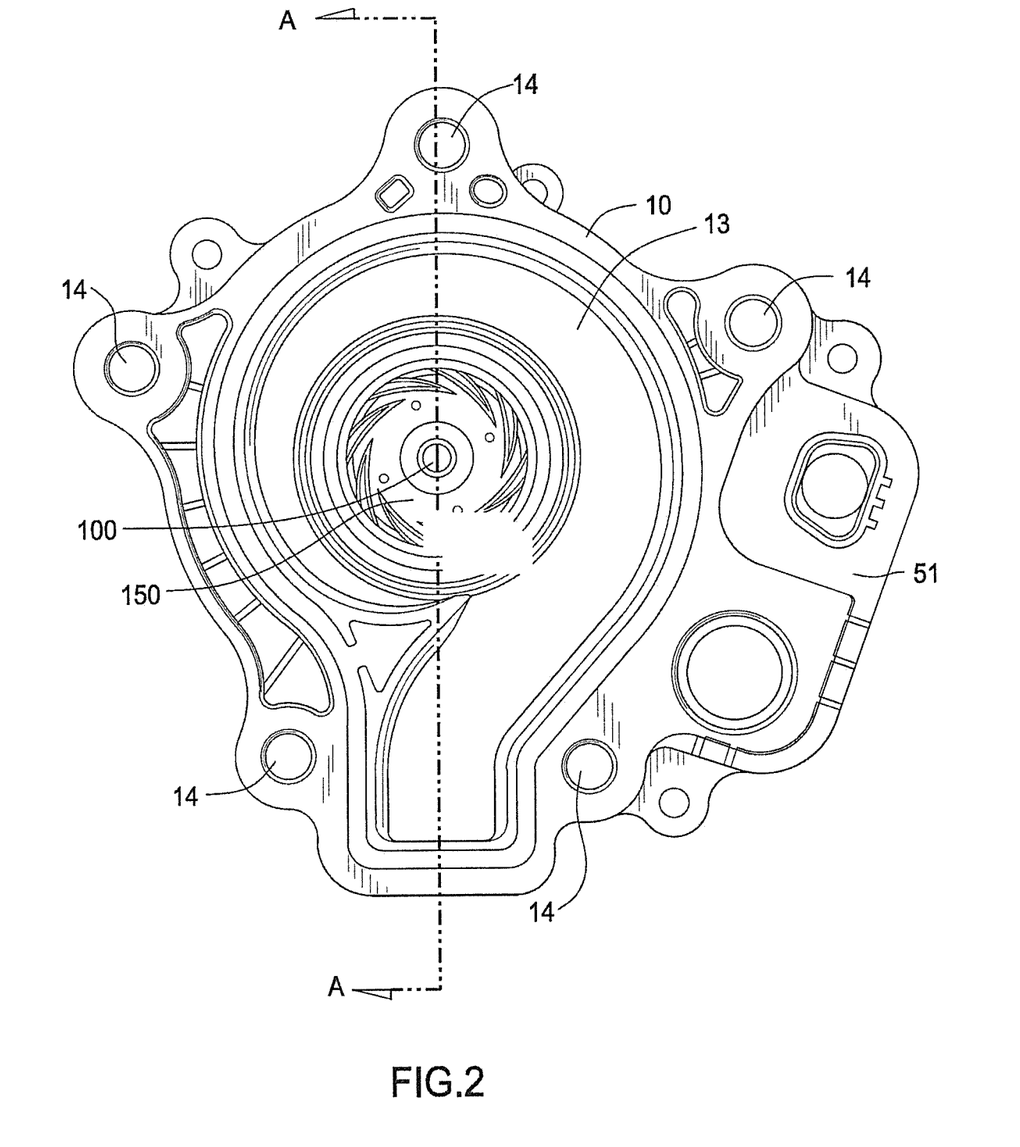
FIG. 2 is a plan view of the pump.

FIG. 1 is a cross-section A-A of the pump from FIG. 2. The water pump comprises an electric motor that drives an impeller. The electric motor comprises an axial flux motor. In an axial flux motor, the magnetic flux extends in the air gap of the motor in the axial direction due to the orientation of the poles and stator windings. The inventive water pump is typically used in an engine cooling system. The water pump pressurizes and circulates coolant through the engine cooling system.

Water pump 1000 comprises a housing 10 and cover 50. Impeller 150 is attached to an end of rotor shaft 100. A stator 200 is disposed within the housing. A plurality of stator poles 201 are disposed in a ring within inner portion 11 of housing 10. As is the case for an axial flux motor, axis B-B of each pole 201 is parallel to the rotational axis D-D of shaft 100. The motor comprises a three-phase nine coil architecture. Stator poles 201 comprise a soft metal composite. Magnetic materials may be used for stator poles 201 as well.

Electrical wire windings 202 are wound around each pole 201. Windings 202 may comprise either flat wire or round wire in cross-section. The flat wire may have a square or rectangular cross-section. The flat wire or round wire may comprise copper or aluminum. A winding plane C-C of windings 202 extends normal to shaft axis D-D so the magnetic flux extends in the axial direction, parallel to axis D-D. The inventive motor has a power rating of 200 W and up to 12 kW.

A plurality of permanent magnets 110 are mounted to another end of shaft 100 on frame 115. Magnets 110 may also comprise a single ring magnet with multiple poles. Frame 115 is fixed to an end of shaft 100 and thereby rotates with shaft 100. Magnets 110 are radially aligned with poles 201. An air gap "G" is maintained between poles 201 and magnets 110 thereby preventing contact between them during operation. The air gap is in the range of 0.2 mm to 1.5 mm. Gap "G" is preferably as small as possible in order to realize maximum magnetic efficiency.

Mechanical seal 250 prevents pressurized liquid coolant from entering the inner portion 11 and thereby coming in contact with the stator 200 and rotor magnets 110, hence, stator 200 and magnets 110 are in a dry zone. The dry zone is typically at ambient atmospheric pressure. Seal 250 is disposed between shaft 100 and housing 10. Seal 250 may comprise any suitable mechanical seal known in the art such as a bellows, cartridge, balanced cartridge and O-ring, unbalanced cartridge and O-ring, pusher and conventional type seals. Maintaining a dry space for the stator and magnets increases the efficiency of the pump by reducing windage and viscous losses which would otherwise exist if inner portion 11 contained coolant and coolant thereby was present in gap "G" between the stator poles and rotor magnets.

Condensate chamber and reservoir 301 comprises a vent hole 302 and drain hole 303. Chamber 301 collects any fluid that may leak past seal 250. Vent 302 and drain 303 are open to ambient.

Thermal potting 12 is used in housing 10 to enrobe stator 200. Thermal potting causes the pump to run cooler by providing a reliable means of heat transfer from the stator and housing. Pump heating typically occurs by iron and copper losses and resistance heating from eddy currents induced in the stator and windings by the varying magnetic field, conduction to the housing from the cooling fluid being pumped, as well as from the engine block (not shown). Thermal potting is known in the electrical arts.

Shaft 100 rotates in a single bearing 120. Bearing 120 may also comprise an integral bearing wherein shaft 100 comprises the bearing inner race. The rotating assembly comprises shaft 100, frame 115, magnets 110 and impeller 150. The single bearing 120 may comprise either a double row ball bearing or double row ball-roller bearing. The roller bearing may comprise cylindrical or tapered rollers. The use of a single bearing is made possible by the short length of the pump shaft afforded by the axial flux motor configuration. The bearings comprise sealed bearings. Due to the short overall length of shaft 100, impeller 150 is cantilever mounted to shaft 100.

Coolant flows into impeller intake 151 and is discharged from outlet 152 as the impeller spins. Impellers are known in the water pump arts. Typical operating discharge pressure can be up to approximately 1.5 bar but may vary to over 5 bar according to the thermal load of the engine. The flow volume may be up to 220 liters per minute or greater up to 500 lpm depending on the application.

Power electronics are disposed in electronics housing 51 in cover 50. Power electronics control the shaft rotational speed and can also detect faults. Axial flux motor power electronics are known in the art. Cover 50 serves as a heat sink to cool the power electronics. The motor is variable speed which allows the coolant fluid flow to be adjusted according to the thermal load requirements of the engine. The control method comprises PWM, LIN protocol/bus or CAN protocol/bus. A LIN bus is a sub-bus system based on a serial communications protocol. The bus is a single master/multiple slave bus that uses a single wire to transmit data. Controller Area Network or CAN protocol is a method of communication between various electronic devices like engine management systems, water pumps, oil pumps, active suspension, ABS, gear control, lighting control, air conditioning, airbags, central locking embedded in an automobile. PWM or pulse width modulation is a type of digital signal that is used in a variety of applications including control circuitry.

FIG. 2 is a plan view of the pump. Discharge volute 13 engages with a cooperating channel in an engine block (not shown). Housing 10 is mounted directly to an engine block. The suction or intake side 150 cooperatively engages a fluid conduit (not shown) in the engine.

Figure 3:
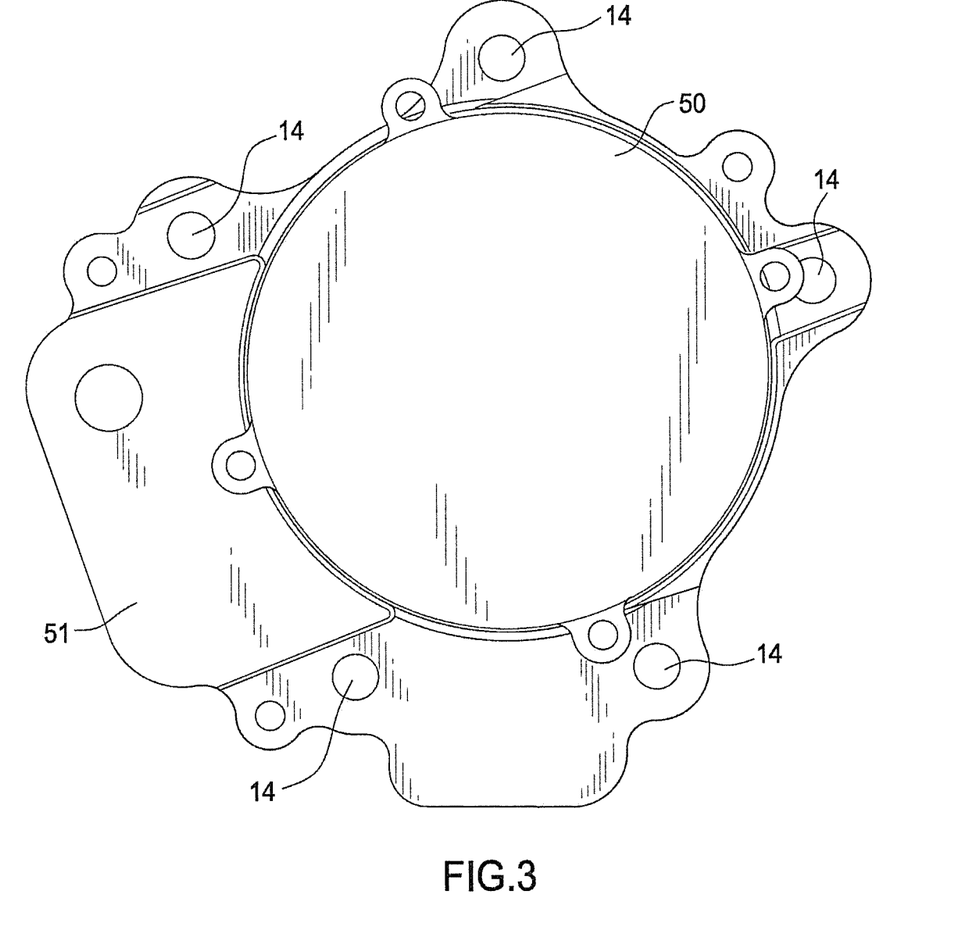
FIG. 3 is a plan view of the pump

FIG. 3 is a plan view of the pump. Fasteners (not shown) engage mounting holes 14 to attach the pump to a mounting surface such as an engine block (not shown).

Figure 4:
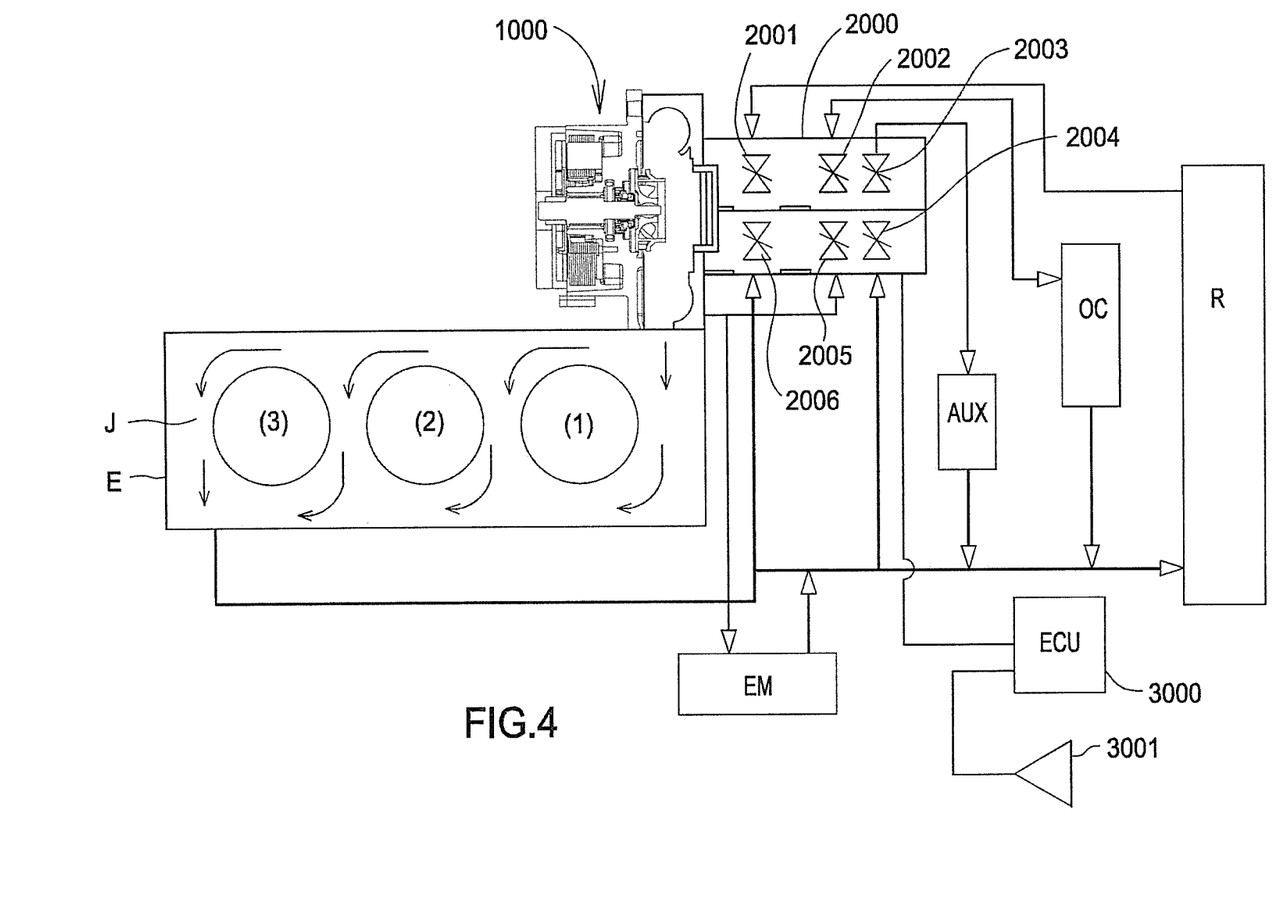
FIG. 4 is a schematic coolant system.

FIG. 4 is a schematic coolant system. Pump 1000 is mounted to an engine (E). Engine (E) comprises three cylinders (1), (2), (3). Engine (E) may comprise any number of cylinders as may be required. Water jacket (J) surrounds the cylinders. The system further comprises a radiator (R), engine transmission oil heat exchanger (OC), auxiliary heat exchanger (AUX), and an exhaust manifold heat exchanger (EM).

A thermal management module 2000 is mounted to the intake side of pump 1000. Module 2000 comprises a plurality of valves 2001, 2002, 2003, 2004, 2005 and 2006. Each valve controls coolant flow for a system component. Valve 2001 controls flow to radiator R. Valve 2002 controls flow to heat exchanger OC. Valve 2003 controls flow to heat exchange AUX. Valve 2004 controls return flow from R, OC, AUX, and EM. Valve 2005 controls recirc flow from pump 1000 and flow to EM. Valve 2006 controls return flow from E, EM, AUX, OC and R. The engine ECU through multiple sensors and input signals (3001) detects engine and system condition, ambient conditions and system and driver requests to set each valve in a desired position to regulate coolant flow and thereby control engine and system thermal performance. Each of the valves is in fluid communication with pump intake 151.

Figure 5:
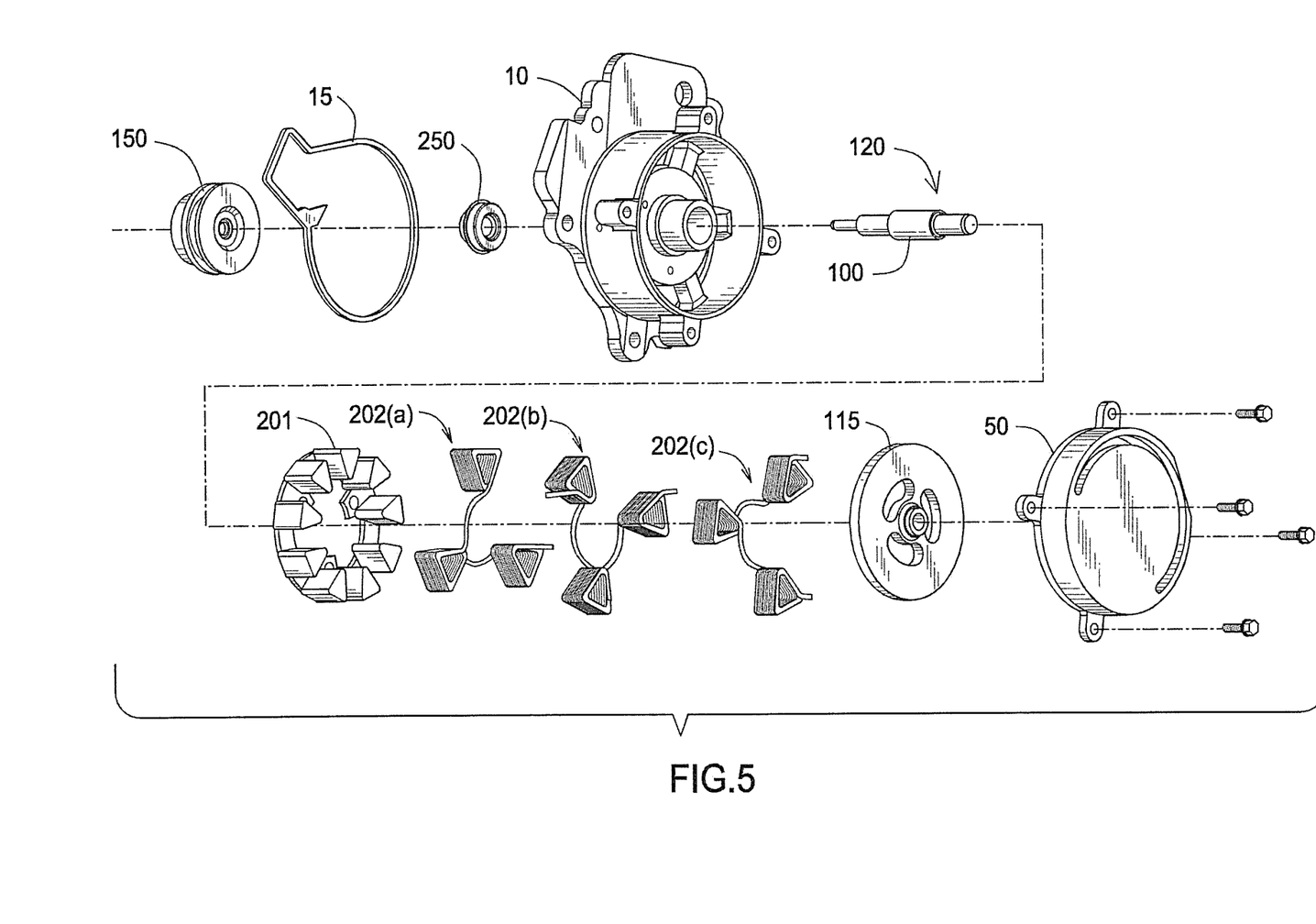
FIG. 5 is an exploded view.

FIG. 5 is an exploded view. The motor is a three-phase motor. Windings 202(*a*) are a first phase. Windings 202(*b*) are a second phase. Windings 202(*c*) are a third phase. In this embodiment each phase comprises three stator poles. However, windings for individual poles with connection to single or multiple phases can also be used. A gasket 15 seals between housing 10 and an engine E.

Figure 6:
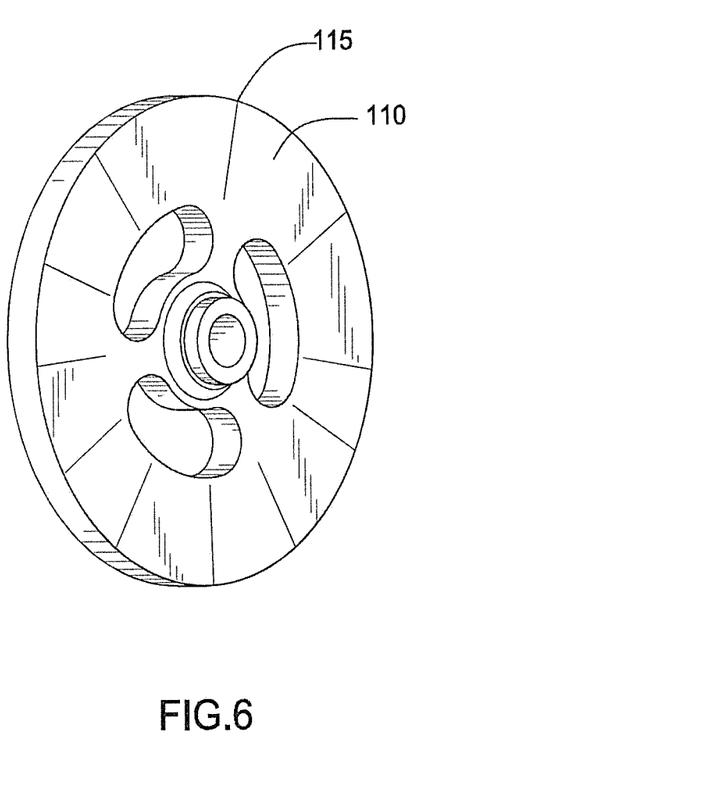
FIG. 6 is a perspective of the rotor magnets and frame.

FIG. 6 is a perspective of the rotor magnets and frame. Magnets 110 are mounted to frame 115. Frame 115 is pressed onto shaft 100. Frame 115 may also comprise blades to circulate cooling air.

Magnet 110 may comprise a ring magnet with poles about the circumference or can comprise a plurality of individual magnets with poles in alternating positions. The magnet may comprise ferrite, rare earth or other known materials. Magnets are attached to the frame using known methods.

Figure 7:
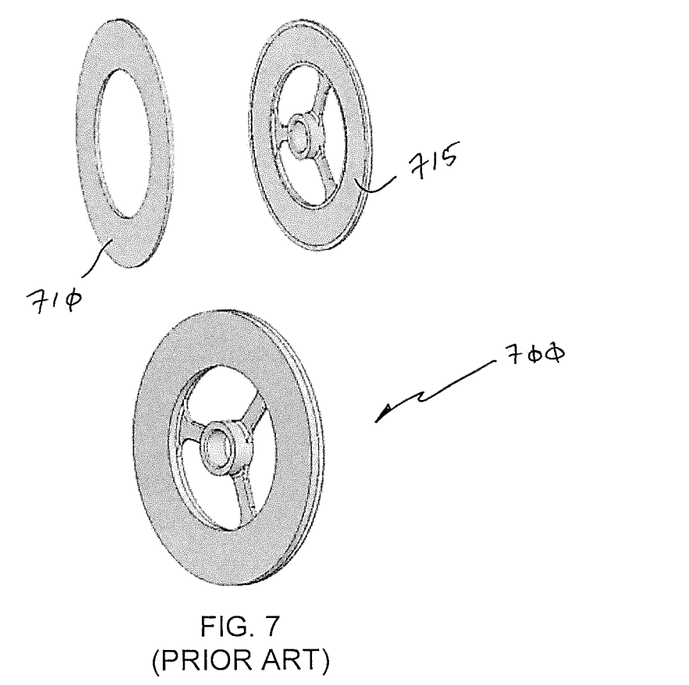
FIG. 7 are perspective views of the components that form a permanent magnet rotor of the prior art.
Figure 8:
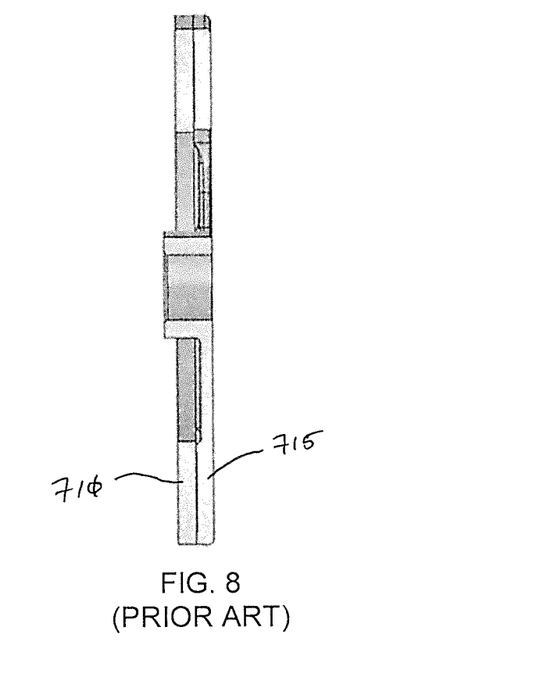
FIG. 8 is a cross-sectional view of an assembled rotor shown in FIG. 7.
Figure 9A:
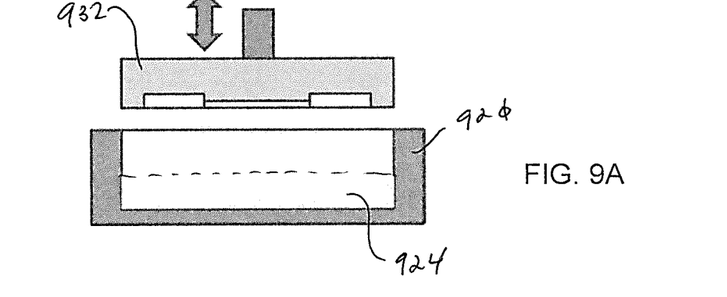
FIGS. 9A-9D illustrate a method of manufacturing a permanent magnet rotor of one embodiment of the present invention in a one-step process.
Figure 9B:
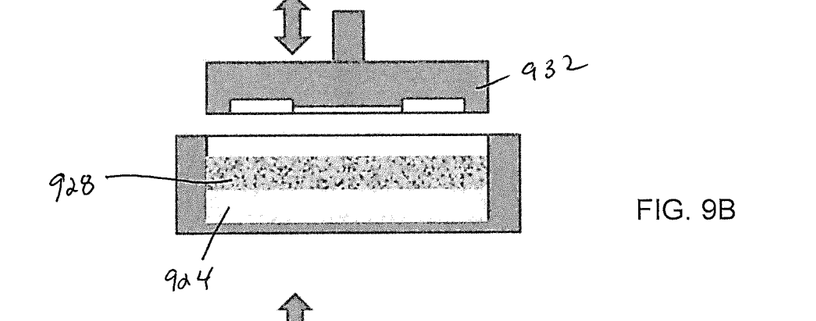
Figure 9C:
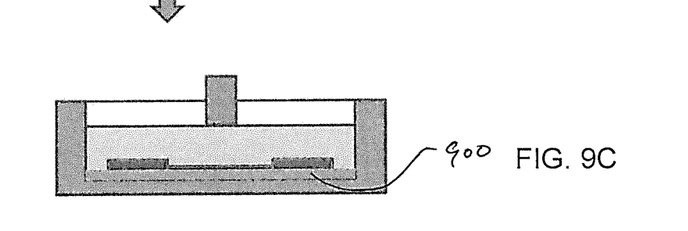
Figure 9D:
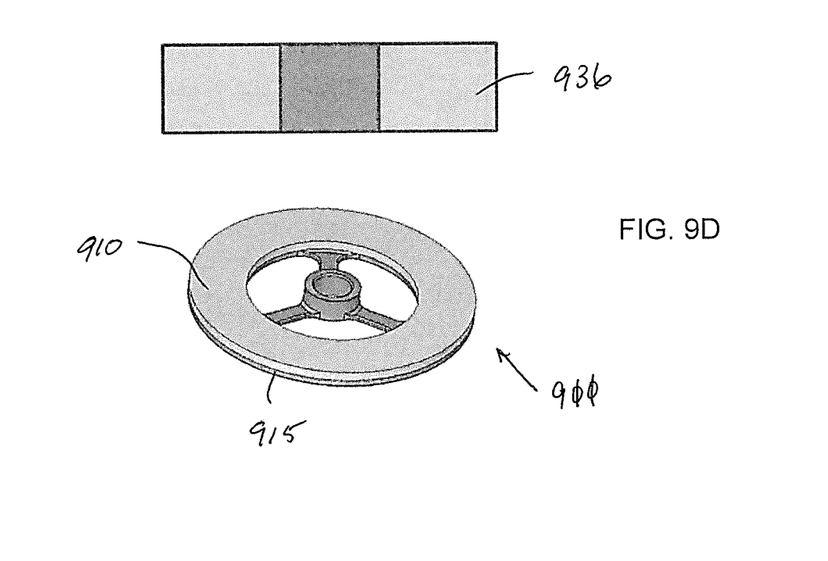
Figure 10A:
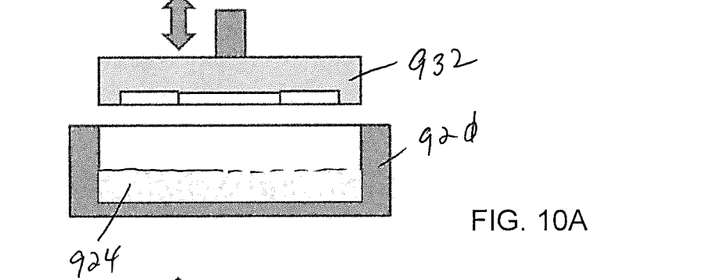
FIGS. 10A-10D illustrate a method of manufacturing a permanent magnet rotor of another embodiment of the present invention in a two process.
Figure 10B:
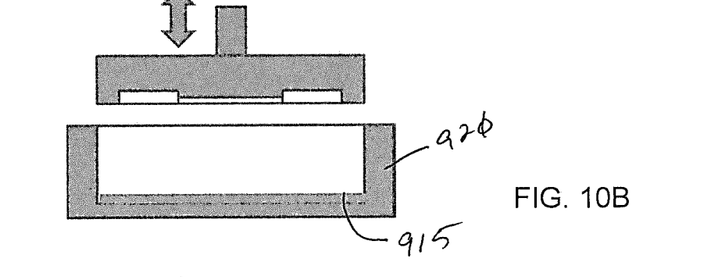
Figure 10C:
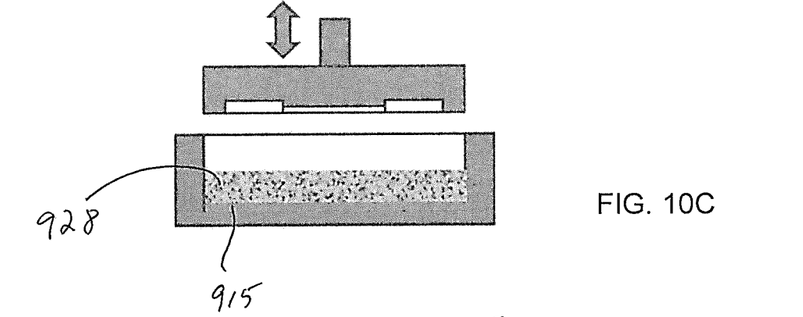
Figure 10D:
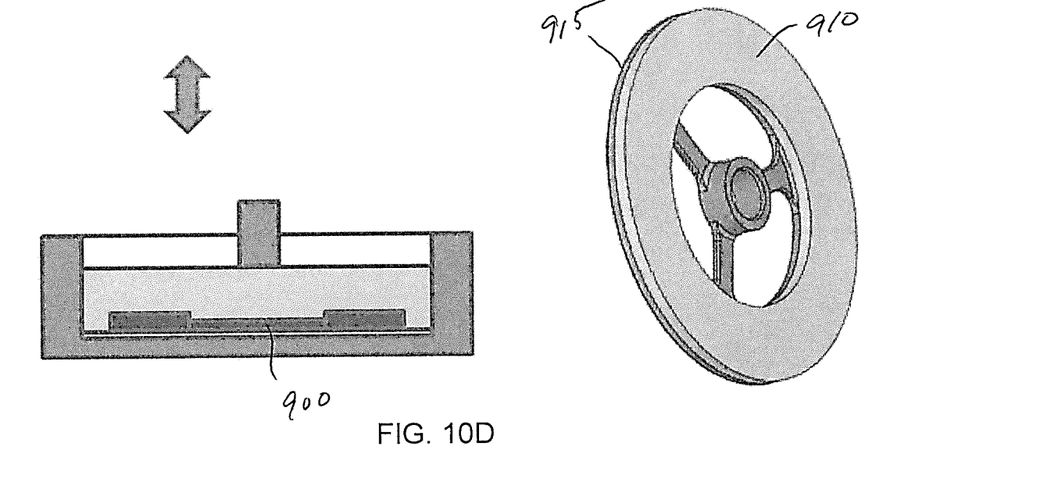

FIGS. 7 and 8 show a permanent magnet rotor 700 of the prior art comprised of a permanent magnet 710 adhered to a frame 715. Those of ordinary skill in the art will appreciate that in some instances, the permanent magnet(s) 710 is secured to the frame 715 with glue, but other interconnection mechanisms, such as interference fit, welding, etc. are commonly used.

FIGS. 9A-9D show one method of manufacturing a rotor 900 of the present invention. Here, a die 920 is filled with powdered material 924 that will eventually be associated with the frame 915 of the rotor. Next, a second powdered material 928 is added to the die 920 above the first material 924. Next, the combined materials are compressed with a ram 932 to form the final shape of the rotor 900. Those of ordinary skill in the art will appreciate that a heating process may be required to enhance the bond between the constituent parts that form the rotor. Finally, a magnet 936 is introduced to the rotor 900 adjacent to the magnetic side 910, thereby magnetizing it using well-known methods.

FIGS. 10A-10D show a two-step method for manufacturing a rotor 900 of the present invention. In this process, material 924 associated with the frame 915 is added to the die 920 and compressed with the ram 932. Next, second powdered material 928 comprising ferromagnetic material is added to the die 920 above the formed frame 915 and compressed to form the rotor 900. Heat treatment may be required to enhance the bond between the constituent parts. As mentioned above, the third constituent part may be employed in either of the processes described above to enhance the bond between the constituent materials. Finally, a magnet 936 is introduced to the rotor 900 adjacent to the magnetic side 910, thereby magnetizing it using well-known methods.

Although forms of the invention have been described herein, it will be obvious to those skilled in the art that variations may be made in the construction and relation of parts without departing from the spirit and scope of the invention described herein. Unless otherwise specifically noted, components depicted in the drawings are not drawn to scale. Numeric examples are used to illustrate the invention and are not intended to limit the breadth of the claims. Further, it is not intended that any of the appended claims or claim elements invoke 35 U.S.C. § 112(f) unless the words "means for" or "step for" are explicitly used in the particular claim. The present disclosure should in no way be limited to the exemplary embodiments or numerical dimensions illustrated in the drawings and described herein.

While various embodiments of the present invention have been described in detail, it is apparent that modifications and alterations of those embodiments will occur to those skilled in the art. It is to be expressly understood that such modifications and alterations are within the scope and spirit of the present invention, as set forth in the following claims. Further, it is to be understood that the invention(s) described herein is not limited in its application to the details of construction and the arrangement of components set forth in the preceding description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising,"

or "having" and variations thereof herein is meant to encompass the items listed thereafter and equivalents thereof as well as additional items.

We claim:

1. An axial flux motor water pump comprising:
   a housing;
   a cover attached to the housing;
   a stator mounted within the housing, the stator comprising a plurality of stator poles mounted in a ring, each stator pole comprising an electric wire winding;
   a rotor journaled to the housing in cooperating relation to the stator on a single bearing, the rotor comprising a rotor shaft having a rotational axis and either a plurality of magnets or a ring magnet, wherein the plurality of magnets or the ring magnet are mounted on a frame on a first end of the rotor shaft in cooperative relation to the stator poles,
   an impeller fixed to a second end of the rotor shaft;
   a seal between the rotor and the housing whereby the stator and the plurality of magnets or the ring magnet are in a dry zone, the plurality of magnets or the ring magnet and the frame being manufactured in a sintering process comprising:
   adding a first material to a die,
   adding a second material to the die above the first material,
   compressing the first material and the second material within the die, and
   magnetizing the second material;
   a condensate chamber and reservoir comprising a vent hole and a drain hole, wherein the condensate chamber and reservoir is positioned to collect any fluid that may leak past the seal, and the vent and drain hole are open to ambient;
   the stator enrobed in thermal potting within the housing; and
   power electronics contained in the cover.

2. The axial flux motor water pump as in claim 1, wherein the electric wire winding comprises a flat wire.

3. The axial flux motor water pump as in claim 1, wherein the electric wire winding comprises a round wire.

4. The axial flux motor water pump as in claim 1, wherein the rotor is journaled on a double row ball bearing.

5. The axial flux motor water pump as in claim 1, wherein the impeller is cantilever mounted to the rotor.

6. The axial flux motor water pump as in claim 1, wherein, in the direction of the rotational axis, the stator is positioned between the impeller and the plurality of magnets or the ring magnet and the frame.

* * * * *